(12) United States Patent
Ishikawa

(10) Patent No.: US 9,973,684 B2
(45) Date of Patent: May 15, 2018

(54) LENS CONTROL APPARATUS AND CONTROL METHOD

(71) Applicant: CANON KABUSHIKI KAISHA, Tokyo (JP)

(72) Inventor: Daisuke Ishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/469,153

(22) Filed: Mar. 24, 2017

(65) Prior Publication Data
US 2017/0289435 A1    Oct. 5, 2017

(30) Foreign Application Priority Data

Mar. 31, 2016   (JP) ................................ 2016-072983

(51) Int. Cl.
*H04N 5/232*   (2006.01)
*G02B 7/28*    (2006.01)

(52) U.S. Cl.
CPC ......... *H04N 5/23212* (2013.01); *G02B 7/282* (2013.01)

(58) Field of Classification Search
CPC ............ C12Q 1/6886; C12Q 2600/118; C12Q 2600/156; G02B 7/282; G06F 19/10; H04N 5/23212
See application file for complete search history.

(56) References Cited

U.S. PATENT DOCUMENTS

| | | | | |
|---|---|---|---|---|
| 7,692,873 B2* | 4/2010 | Okawara | ................ | G02B 7/102 250/201.2 |
| 2009/0310229 A1* | 12/2009 | Yang | .................. | A61B 1/00096 359/694 |
| 2010/0178045 A1* | 7/2010 | Hongu | ................... | G02B 7/102 396/80 |
| 2012/0050577 A1* | 3/2012 | Hongu | ................... | G02B 7/102 348/240.1 |
| 2012/0120303 A1* | 5/2012 | Yamanaka | ............. | G02B 7/102 348/347 |
| 2014/0111628 A1* | 4/2014 | Yoshino | ............. | H04N 5/23296 348/65 |
| 2015/0195473 A1* | 7/2015 | Inoue | ................. | H04N 5/23212 348/294 |

FOREIGN PATENT DOCUMENTS

JP    2012-255910 A    12/2012
JP    2013-130827 A    7/2013

* cited by examiner

*Primary Examiner* — Amy Hsu
(74) *Attorney, Agent, or Firm* — Canon USA Inc., IP Division

(57) ABSTRACT

A lens control apparatus and a control method thereof are disclosed. The lens control apparatus includes a microprocessor which obtains a correction defocus amount so that the correction defocus amount obtained by the microprocessor when a zoom speed is a first speed is greater than the correction defocus amount obtained by the microprocessor when a zoom speed is a second speed which is less than the first speed.

22 Claims, 18 Drawing Sheets

FIG.2

PIXEL CONFIGURATION OF IMAGE SENSOR 106

| R A | R B | G A | G B | R A | R B | G A | G B | R A | R B | G A | G B | R A | R B | G A | G B | R A | R B | G A | G B | R A | R B | G A | G B |
|---|---|---|---|---|---|---|---|---|---|---|---|---|---|---|---|---|---|---|---|---|---|---|---|
| G A | G B | B A | B B | G A | G B | B A | B B | G A | G B | B A | B B | G A | G B | B A | B B | G A | G B | B A | B B | G A | G B | B A | B B |

LENS CONTROL APPARATUS AND CONTROL METHOD

BACKGROUND OF THE INVENTION

Field of the Invention

The present invention relates to a lens control apparatus used in an optical apparatus such as a camera to control a focus lens and a control method thereof.

Description of Related Art

As a conventional technique related to driving control of a focus lens during zooming, a technique is known which controls driving of a focus lens using cam locus data which represents a position of the focus lens corresponding to a position of a zoom lens. According to the conventional technique, which cam locus data is to be based on to drive the focus lens is repeatedly determined according to focus detection results and lens positions of the zoom lens which are repeatedly obtained, and the focus lens is driven based on the determined cam locus data.

Japanese Patent Application Laid-Open No. 2013-130827 describes a technique in which a lens control apparatus includes cam locus data and a unit for measuring a distance to an object and controls driving of a focus lens by limiting a range of the relevant data according to the distance to the object. Japanese Patent Application Laid-Open No. 2012-255910 describes a technique in which cam locus data is included, and focus detection is repeated based on signals repeatedly obtained from an image sensor, so that driving of a focus lens is controlled based on the results of the focus detection and the relevant data.

When driving of a focus lens is controlled during zooming based on cam locus data, it is desirable that the control is performed so as to make a change in a focus state inconspicuous. Thus, it can be considered that the driving is controlled to reduce responsiveness of the focus lens for a certain degree. However, if the responsiveness is reduced, the driving of the focus lens to a focusing position may not be performed in time in a case that focus detection is less frequently performed with respect to a change in a zoom magnification, and an image blur may be significantly conspicuous in some cases. For example, when a zoom speed is high under certain conditions, the focus detection is less frequently performed with respect to the change in the zoom magnification as compared with the case when the zoom speed is low. In addition, when a frame rate of an image sensor is low under certain conditions, the focus detection is less frequently performed with respect to the change in the zoom magnification since a period to repeatedly detect the focus becomes short if the focus detection is performed using signals repeatedly obtained from the image sensor.

SUMMARY OF THE INVENTION

Thus, the present invention is directed to the provision of a lens control apparatus which can control driving of a focus lens to make a change in a focus state inconspicuous when controlling the driving of the focus lens based on, for example, cam locus data and the like. The present invention is also directed to the provision of a control method thereof.

According to an aspect of the present invention, a lens control apparatus includes a correction unit configured to correct a defocus amount and obtain a correction defocus amount, a target zoom lens position obtainment unit configured to obtain a target zoom lens position, and a target focus lens position obtainment unit configured to obtain a target focus lens position based on data representing a position of a focus lens corresponding to a position of a zoom lens for each object distance, the correction defocus amount, and the target zoom lens position, wherein, in a case that a zoom speed is a first speed, the correction unit corrects the correction defocus amount to be greater as compared with a case that the zoom speed is a second speed less than the first speed.

Further, according to another aspect of the present invention, a lens control apparatus includes a correction unit configured to correct a defocus amount and obtain a correction defocus amount, a target zoom lens position obtainment unit configured to obtain a target zoom lens position, and a target focus lens position obtainment unit configured to obtain a target focus lens position based on data representing a position of a focus lens corresponding to a position of a zoom lens for each object distance, the correction defocus amount, and the target zoom lens position, wherein, in a case that a frame rate is a first frame rate, the correction unit corrects the correction defocus amount to be larger as compared with a case that the frame rate is a second frame rate higher than the first frame rate.

Further features of the present invention will become apparent from the following description of exemplary embodiments with reference to the attached drawings.

BRIEF DESCRIPTION OF THE DRAWINGS

FIG. 2 illustrates a pixel configuration of an image sensor.

DESCRIPTION OF THE EMBODIMENTS

Figure 1:
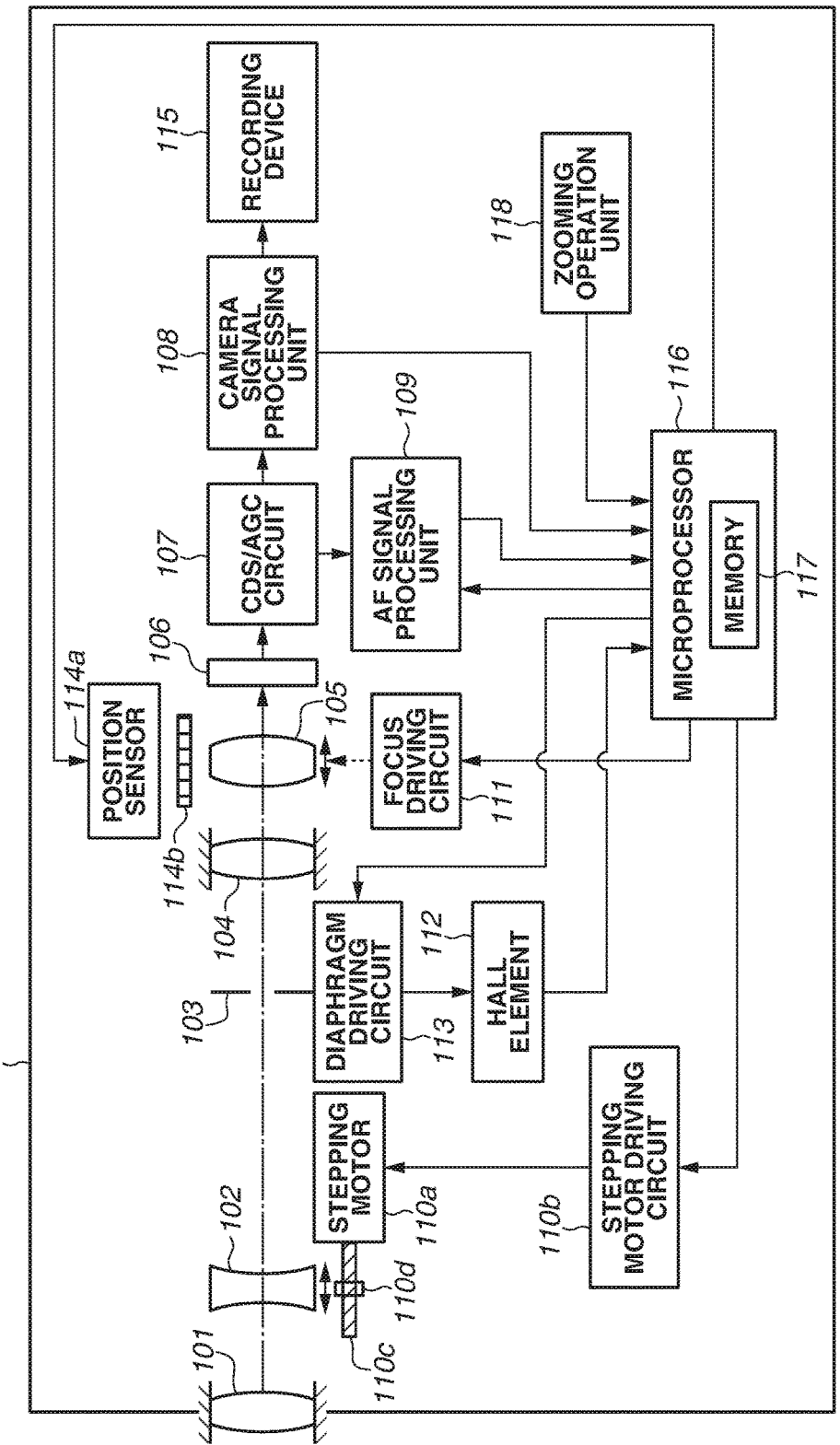
FIG. 1 is a block diagram illustrating a configuration of an image capturing apparatus.

FIG. 1 illustrates a configuration of a video camera (an image capturing apparatus) to which the present invention is applied. The present invention can be applied to a case when another image capturing apparatus such as a digital still camera captures a moving image.

An imaging optical system includes a first fixed lens 101, a zoom lens 102, a diaphragm 103, a second fixed lens 104, and a focus compensator lens (hereinbelow, referred to as a focus lens 105). The zoom lens 102 changes a magnification by moving in an optical axis direction.

An image sensor 106 is a photoelectric conversion element, for example, a complementary metal oxide semiconductor (CMOS) sensor and a charge coupled device (CCD) sensor. In the image sensor 106, as shown in FIG. 2, each pixel unit includes two photodiodes (a photodiode A and a photodiode B). Light beams are separated by a micro lens and focused onto these two photodiodes, so that two signals, i.e., an image signal and an AF signal can be extracted. According to a first exemplary embodiment, the image signal is a signal obtained by adding signals (A+B) of the two photodiodes. An image to be recorded in a recording device 115 and an image to be displayed on a display (not illustrated) are generated based on the image signal. According to the first exemplary embodiment, the AF signal is an individual signal (A, B) obtained from each of the two photodiodes. An AF signal processing unit 109 performs correlation calculation with respect to a pair of image signals generated based on the AF signal and calculates an image blur amount and various reliability information parameters. A method for performing focus detection using the signal of the image sensor 106 as described above is the focus detection in an imaging plane phase difference type method. The focus detection according to the first exemplary embodiment is to calculate a defocus amount based on the image blur amount. Processing is described in detail below.

The image signal and the AF signal read from the image sensor 106 are input to a correlated double sampling/automatic gain control (CDS/AGC) circuit 107 for sampling and gain adjustment. The CDS/AGC circuit 107 outputs the processed image signal to a camera signal processing unit 108 and the AF signal to the AF signal processing unit 109.

The AF signal processing unit 109 (a focus detection unit) performs correlation calculation on a pair of image signals generated from the AF signal obtained from the CDS/AGC circuit 107 to calculate a defocus amount and reliability information (a two-image matching level, a steepness level, contrast information, saturation information, defect information, and the like). The AF signal processing unit 109 outputs the calculated defocus amount and reliability information to a microprocessor 116. The microprocessor 116 changes a setting for calculating these amounts and information to control of the AF signal processing unit 109, based on the obtained defocus amount and reliability information.

A stepping motor driving circuit 110b drives a stepping motor 110a which is a driving source for driving the zoom lens 102. In the stepping motor 110a, a feed screw shaft 110c as an output shaft is engaged. When the stepping motor 110a is driven and the feed screw shaft is rotated, the zoom lens is driven to the optical axis direction (an arrow direction in FIG. 1) by an engagement action between the feed screw shaft 110c and a rack 110d.

When the zoom lens 102 is driven by the stepping motor 110a to a target position, first, the zoom lens 102 is set to a position to be a reference of position control (hereinbelow, referred to as a reference position) at a start of an image capturing apparatus 100. A driving signal having a pulse number necessary for moving the zoom lens 102 from the reference position to the target position is input to the stepping motor 110a. Thus, the image capturing apparatus 100 includes a reference position sensor (not illustrated) for detecting whether the zoom lens 102 is placed on the reference position.

A focus driving circuit 111 includes a driving source and drives the focus lens 105 to the target position. A position scale 114b for detecting a position of the focus lens 105 is fixed to a holding frame (not illustrated) of the focus lens 105, and a position sensor 114a is fixed to a position facing the position scale 114b. A scale pattern such as a magnetic pattern and a light reflection pattern is formed on the position scale 114b in the optical axis direction, and the position sensor 114a reads the magnetic signal, the light reflection signal, and the like corresponding to the position of the scale and detects the position of the focus lens 105 in the optical axis direction. The focus lens 105 is exemplified as the one driven by a voice coil motor (VCM), however, another type of actuator such as a direct current (DC) motor can be used. The stepping motor may be used as a driving source of the focus lens 105 to omit the position sensor 114a and the position scale 114b attached to the focus lens holding frame. When the stepping motor is used as the driving source of the focus lens 105, a pulse count is used as position information.

The microprocessor 116 controls entire operations of the image capturing apparatus 100 in response to inputs from a zooming operation unit 118 and switches such as a power switch (not illustrated) and a video recording switch (not illustrated). A memory 117 included in the microprocessor 116 stores positions (a tele end and a wide end) on a telephoto direction and a wide-angle direction of the zoom lens 102 with respect to the reference position as data pieces of the zoom lens positions.

The memory 117 further includes cam locus data storing a focusing cam locus of each object distance which represents a change in a focusing position of the focus lens 105 with respect to a change in the position of the zoom lens 102. The cam locus data according to the first exemplary embodiment is data representing the target position of the focus lens corresponding to a zoom position by a plurality of cam loci. The memory 117 further includes lens-unit-specific data such as control resolution of the focus lens 105.

Figure 18:
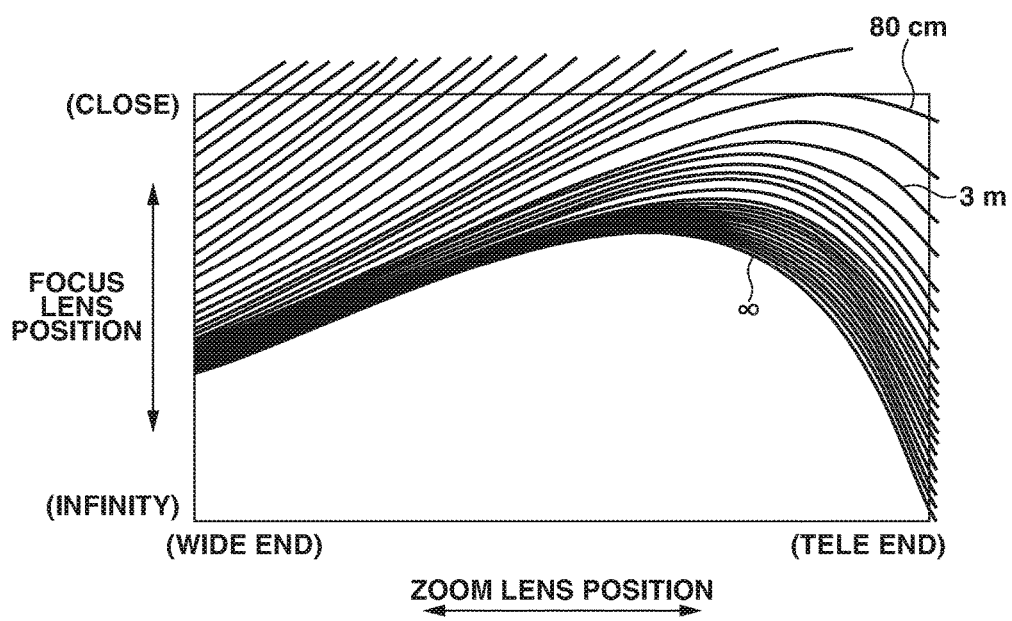
FIG. 18 illustrates cam locus data.

The stepping motor 110a is driven in response to positive and negative phase signals input to the stepping motor driving circuit 110b from the microprocessor 116. The focus driving circuit 111 is driven by a control signal from the microprocessor 116. In other words, a zooming operation and a focusing operation of the imaging optical system are performed by controlling the focus driving circuit 111 by an electronic cam system using the cam locus data (FIG. 18) which is generally used in a video camera.

The diaphragm 103 includes a diaphragm driving circuit 113 including a galvano optical system actuator (not illustrated), a diaphragm blade which is driven by the actuator to open and close, and a position detection element 112 (a Hall element) for detecting an open/closed state of the diaphragm.

An electrical signal photoelectrically converted by the image sensor 106 is processed by the CDS/AGC circuit 107 and then input to the camera signal processing unit 108. The camera signal processing unit 108 transmits an image signal from the input electrical signal to the recording device 115. The recording device 115 records a moving image and a still image. As a recording medium, a semiconductor memory, a magnetic tape, and a digital versatile disk (DVD) are used.

The microprocessor 116 performs feedback control on the diaphragm driving circuit 113 so that an input luminance signal component always has an appropriate value. In this regard, an output from the Hall element 112 is amplified, converted from an analog signal to a digital signal by an analog-to-digital (A/D) conversion circuit (not illustrated), and input to the microprocessor 116 as information representing the open/closed state of the diaphragm. The microprocessor 116 transmits a signal to the diaphragm driving circuit 113 to control the diaphragm 103 based on information from the Hall element 112 so that the luminance signal component always has the appropriate value. The microprocessor 116 can transmit a signal to fix the diaphragm to a predetermined open/closed state to the diaphragm driving circuit 113.

[Calculation Method of Two-Image Matching Level]

Next, processing performed by the AF signal processing unit 109 is described with reference to FIGS. 3 to 9.

Figure 3:
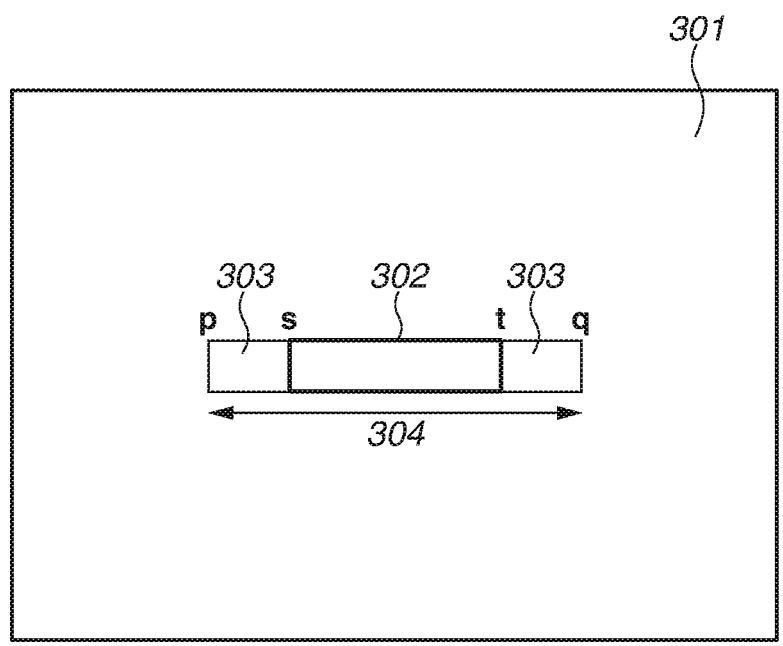
FIG. 3 illustrates an automatic focus (AF) area.

FIG. 3 illustrates an example of an area on the image sensor 106 for obtaining an image signal used in focus detection processing. An AF area 302 and a shift area 303 for the correlation calculation are areas in a pixel array 301 included in the image sensor 106. A correlation calculation area 304 which includes the AF area 302 and the shift area 303 is necessary for performing the correlation calculation.

Coordinates p, q, s, and t in the drawing each represent coordinates in an x-axis direction, from the coordinate p to the coordinate q represents the correlation calculation area 304, and from the coordinate s to the coordinate t represents the AF area 302.

Figure 4A:
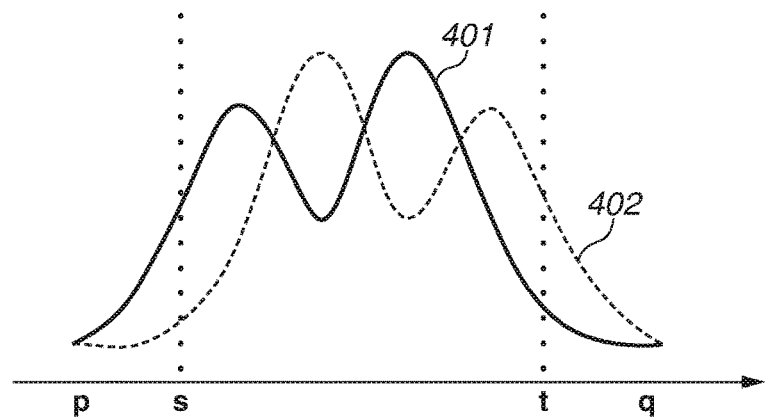
FIGS. 4A to 4C illustrate image signals obtained from the AF area.
Figure 4B:
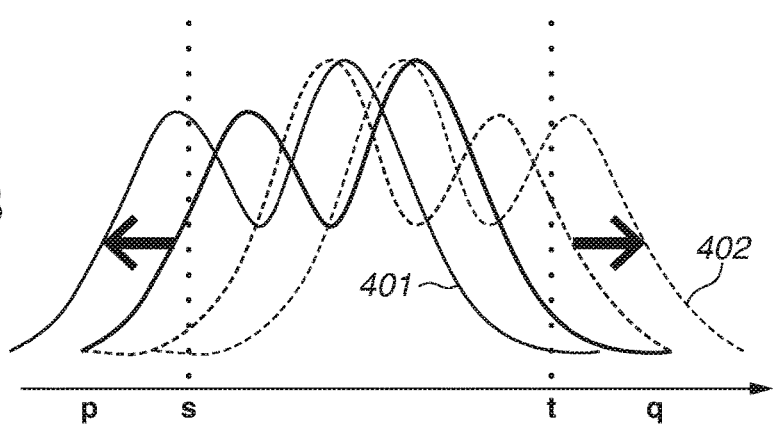
Figure 4C:
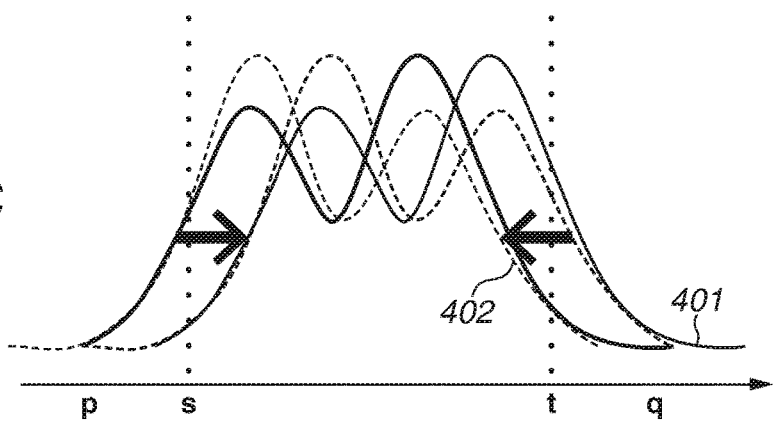

FIGS. 4A, 4B, and 4C illustrate the image signals obtained from the AF area 302 set in FIG. 3. From the coordinate s to the coordinate t is an area for detecting the defocus amount, and from the coordinate p to the coordinate q is an area necessary for the correlation calculation based on a shift amount.

FIG. 4A illustrates waveforms of image signals before the shift. A solid line 401 indicates an image signal A, a dashed line 402 indicates an image signal B, and the image signal A and the image signal B include a parallax. FIG. 4B illustrates waveforms shifted to a plus direction with respect to the waveforms before the shift in FIG. 4A, and FIG. 4C illustrates waveforms shifted to a minus direction with respect to the waveforms before the shift in FIG. 4A. When a correlation amount COR is calculated, the solid line 401 and the dashed line 402 are shifted for one bit each to respective arrow directions.

A calculation method of the correlation amount COR is described. As described with reference to FIGS. 4B and 4C, the image signal A and the image signal B are shifted for one bit each, and a total sum of absolute values of differences between the image signal A and the image signal B at that time is calculated. In this regard, a shift amount is expressed as i, a minimum shift number is (p–s) in FIGS. 4A to 4C, and a maximum shift number is (q–t) in FIGS. 4A to 4C. Further, a start coordinate and an end coordinate of the AF area 302 are respectively expressed as x and y, and information indicating a position of a pixel (e.g. pixel number) is expressed as k. The correlation amount COR can be calculated by a following formula (1).

[Formula 1]

$$COR[i] = \sum_{k=x}^{y} |A[k+i] - B[k-i]|$$
$$\{(p-s) < i < (q-t)\}$$

(1)

Figure 5:
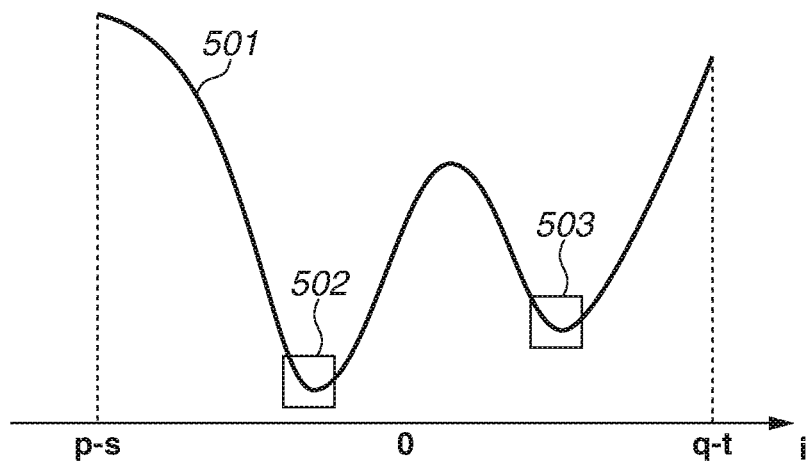
FIG. 5 illustrates a correlation amount waveform.

FIG. 5 illustrates a calculated correlation amount COR in a waveform. An abscissa axis and an ordinate axis of the graph respectively indicate the shift amount and the correlation amount. FIG. 5 further illustrates a correlation amount waveform 501 and extreme value peripheries 502 and 503 of the correlation amount waveform 501. As the correlation amount is smaller, the matching level of the image A and the image B is higher.

A calculation method of a correlation change amount ΔCOR is described, as follows. First, the correlation change amount is calculated from a difference of the correlation amounts obtained by skipping one shift based on a correlation waveform, for example, as the correlation waveform shown in FIG. 5. In this regard, the shift amount is expressed as i, the minimum shift amount is (p–s) in FIGS. 4A to 4C, and the maximum shift amount is (q–t) in FIGS. 4A to 4C. The correlation change amount ΔCOR can be calculated by a following formula (2) using these values.

[Formula 2]

$$\Delta COR[i] = COR[i-1] - COR[i+1]\{(p-s+1) < i < (q-t-1)\}$$ (2)

Figure 6:
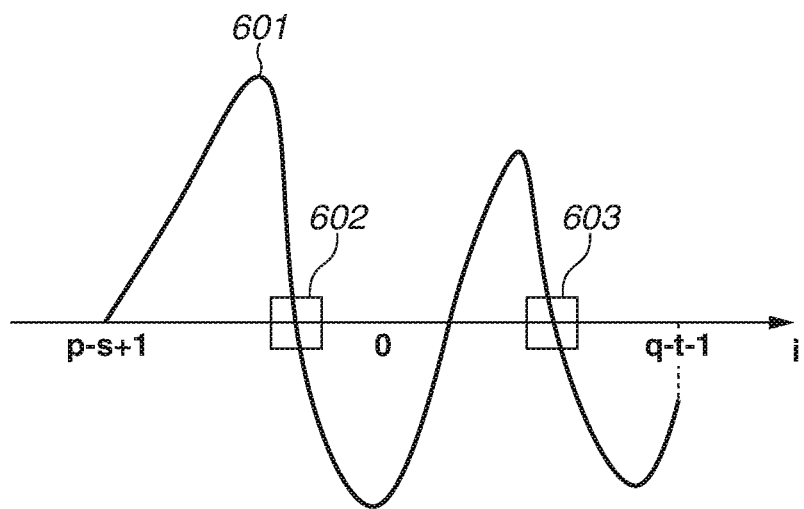
FIG. 6 illustrates a correlation change amount waveform.

FIG. 6 illustrates a calculated correlation change amount ΔCOR in a waveform. An abscissa axis and an ordinate axis of the graph respectively indicate the shift amount and the correlation change amount. FIG. 6 further illustrates a correlation change amount waveform 601 and peripheral portions 602 and 603 at which the correlation change amount of the correlation change amount waveform 601 change from positive to negative (peripheries of portions at which the correlation change amount becomes zero). A point at which the correlation change amount becomes zero is referred to as a zero crossing. The matching level of the image A and the image B is the highest at the zero crossing, and the shift amount from the zero value is the image blur amount.

Figure 7:
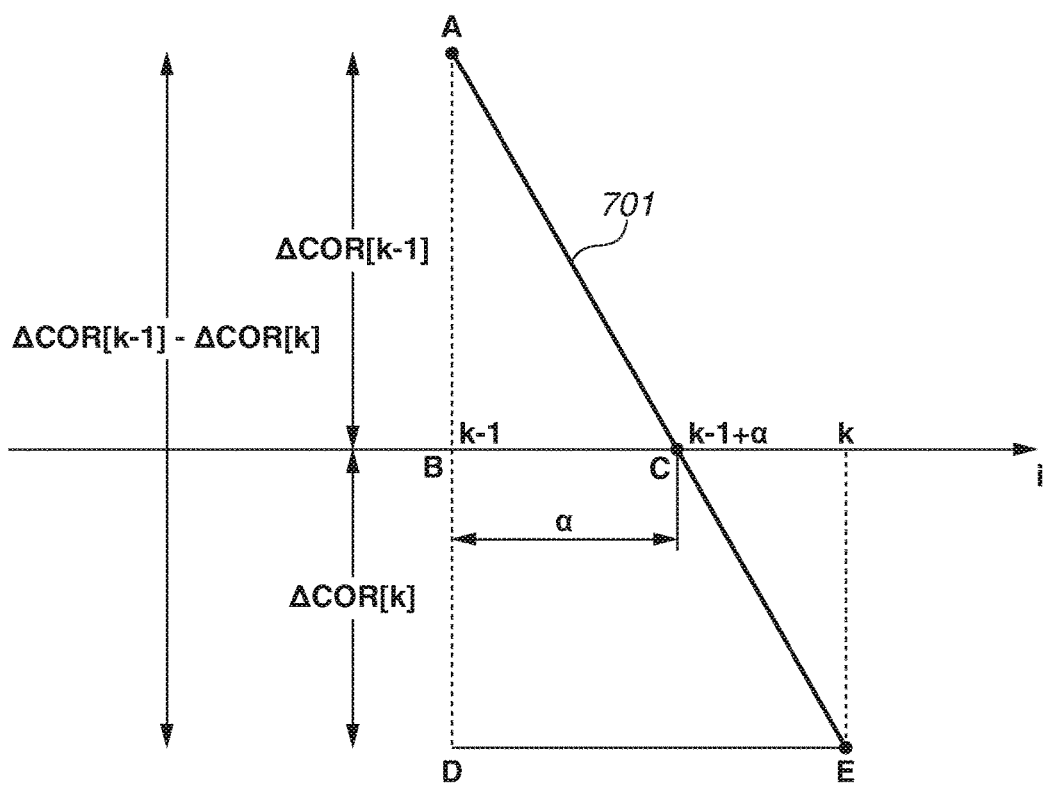
FIG. 7 illustrates a method for calculating an image shift amount.

FIG. 7 is an enlarged view of the peripheral portion 602 in FIG. 6, and a correlation change amount waveform 701 is a part of the correlation change amount waveform 601. A calculation method of an image shift amount PRD is described with reference to FIG. 7. First, the image shift amount is separated into an integer part β and a fractional part α. The fractional portion α can be calculated by a following formula (3) from a similarity relationship of a triangle ABC and a triangle ADE in the drawing.

[Formula 3]

$$AB:AD = BC:DE$$ (3)
$$\Delta COR[k-1] : \Delta COR[k-1] - \Delta COR[k] =$$
$$\alpha : k - (k-1)$$
$$\alpha = \frac{\Delta COR[k-1]}{\Delta COR[k-1] - \Delta COR[k]}$$

The integer part β can be calculated by a following formula (4) from FIG. 7.

[Formula 4]

$$\beta = k - 1$$ (4)

As described above, the image shift amount PRD can be calculated from the total sum of α and β.

When a plurality of zero crossings exist as in FIG. 6, a zero crossing of which the slope (steepness) MAXDER (hereinbelow, referred to as steepness) in the correlation amount change curve is the largest is referred to as a first zero crossing. The steepness is an index indicating ease of the AF, and as the value is greater, the AF is easier at that point. The slope or steepness can be calculated by a following formula (5).

[Formula 5]

$$\max der = |\Delta COR[k-1]| + |\Delta COR[k]| \quad (5)$$

As described above, when a plurality of zero crossings exist, the first zero crossing is determined by the highest steepness. A calculation method of reliability of the image shift amount is described.

The reliability can be defined by the steepness and a matching level fnclvl of two images, i.e., the images A and B (hereinbelow, referred to as a two-image matching level). The two-image matching level is an index indicating an accuracy of the image shift amount, and as the value is smaller, the accuracy is higher.

Figure 8:
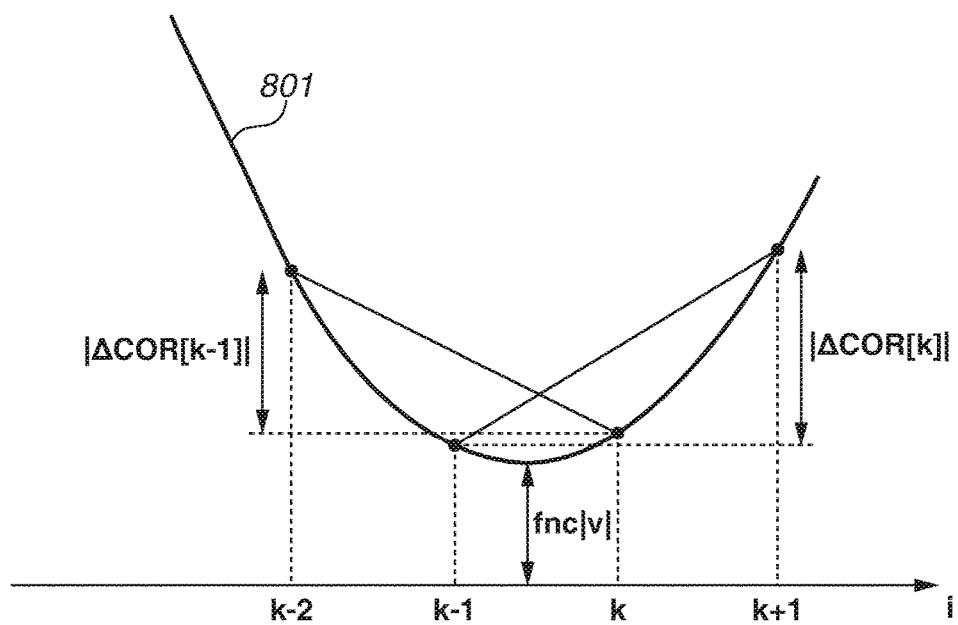
FIG. 8 illustrates a method for calculating a two-image matching level.

FIG. 8 is an enlarged view of the extreme value periphery 502 in FIG. 5, and a correlation amount waveform 801 is a part of the correlation amount waveform 501. Calculation methods of the steepness and the two-image matching level are described with reference to FIG. 8. The two-image matching level can be calculated by a following formula (6)

[Formula 6]

(i) In the case of $$|\Delta COR[k-1]|*2 \leq MAXDER$$

$$fnclvl = COR[k-1] + \Delta COR[k-1]/4$$

In the case of $$|\Delta COR[k-1]|*2 \leq MAXDER$$

$$fnclvl = COR[k] - \Delta COR[k]/4 \quad (6)$$

[Defocus Amount Calculation Processing]

Figure 9:
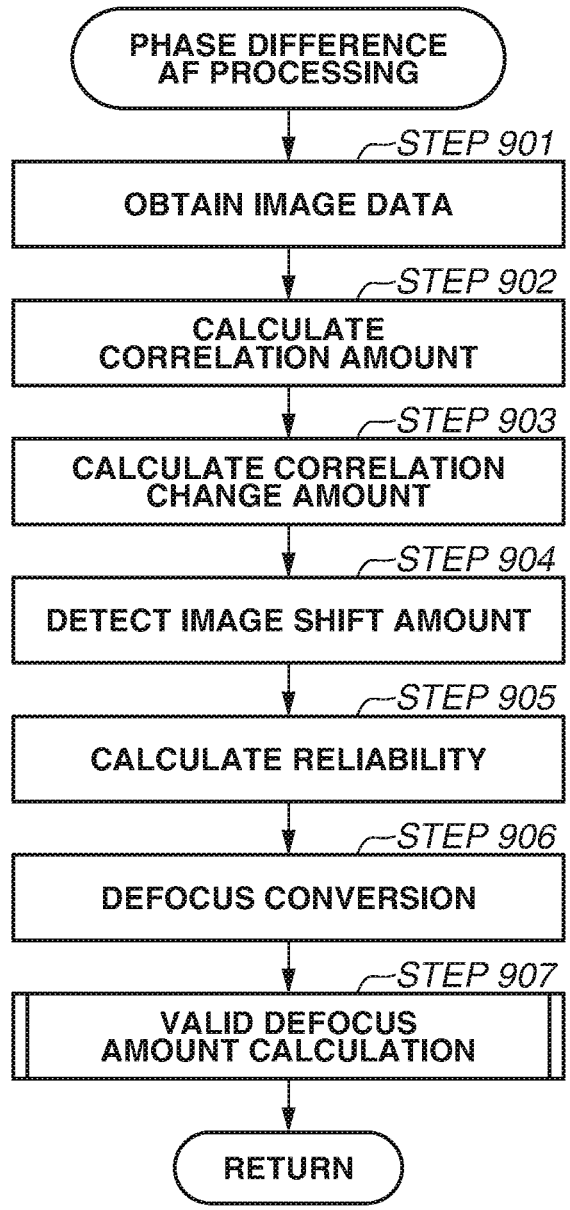
FIG. 9 is a flowchart for calculating a defocus amount.

FIG. 9 is a flowchart illustrating the defocus amount calculation. In Step 901, an image signal is obtained from the AF area 302 which is arbitrarily set.

Next, in Step 902, the correlation amount is calculated from the image signal obtained in Step 901. Subsequently, in Step 903, the correlation change amount is calculated from the correlation amount calculated in Step 902.

In Step 904, the image shift amount (the two-image matching level described above) is calculated from the correlation change amount calculated in Step 903.

In Step 905, the reliability is calculated as explained in [0055], which indicates how the image shift amount calculated in Step 904 is reliable. The processing from Step 901 to Step 904 is performed for the number of the AF areas.

Then, in Step 906, the image shift amount is converted to the defocus amount for each AF area.

Last, in Step 907, a valid defocus amount is calculated.

Figure 10:
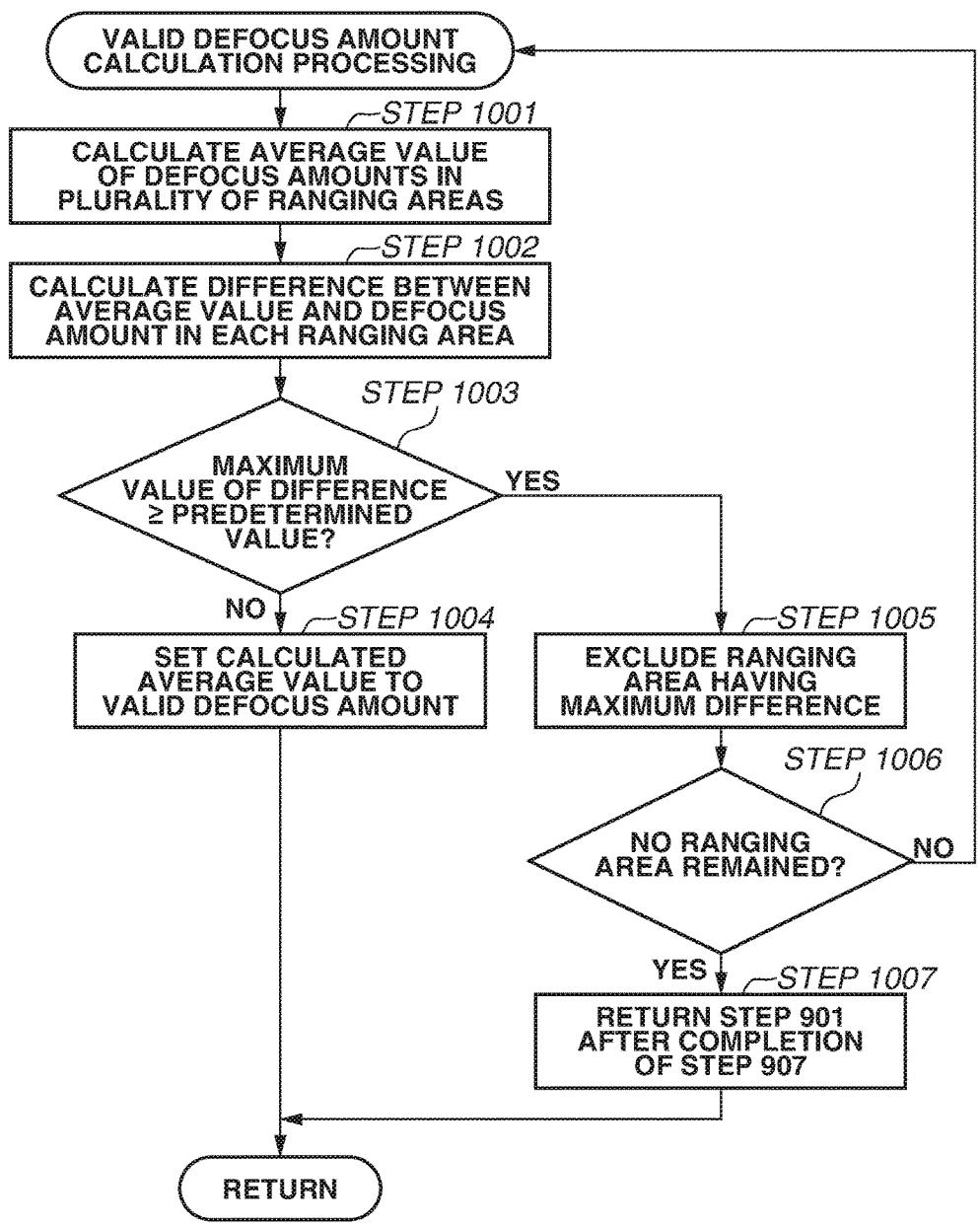
FIG. 10 is a flowchart for calculating a valid defocus amount.

FIG. 10 is a sub-flowchart illustrating processing for calculating the valid defocus amount in the above-described Step 907.

First, in Step 1001, the microprocessor 116 searches for the AF area 302 of which the defocus amount is obtained by the processing in Step 906 and the reliability is higher than a predetermined value among a plurality of the AF areas 302. Then, the microprocessor 116 calculates an average value of the defocus amounts of the searched AF areas 302.

Next, in Step 1002, the microprocessor 116 calculates a difference between the defocus amount of each AF area calculated by the processing in Step 906 and the average value calculated in Step 1001.

In Step 1003, the microprocessor 116 determines whether a maximum value of the calculated difference is greater than or equal to a predetermined value. According to the first exemplary embodiment, the predetermined value is set to a quadruple value of a focal depth as an example, however, the value is not limited thereto.

When the maximum value of the calculated difference is less than the predetermined value (NO in Step 1003), in Step 1004, the microprocessor 116 sets the average value calculated in Step 1001 to the valid defocus amount.

On the other hand, when the maximum value of the calculated difference is greater than or equal to the predetermined value (YES in Step 1003), in Step 1005, the microprocessor 116 excludes the AF area of which the difference is the maximum from the calculation target.

In Step 1006, the microprocessor 116 determines whether there is a remained AF area (whether the AF area of which the difference is less than the predetermined value remains). When there is the remained AF area (NO in Step 1006), the processing proceeds to Step 1001 again and is repeated. When there is no remained AF area (YES in Step 1006), in Step 1007, the microprocessor 116 determines that the valid defocus amount cannot be obtained and performs control to return the processing to Step 901 after completing Step 907 (the present flowchart).

In the processing for calculating the valid defocus amount in FIG. 10, the AF area may be weighted which is determined by the microprocessor 116 that an object exists in a proximal direction from the defocus amount. This is because an object aimed by a photographer is presumed to exist in a proximal side than a background, so that focusing on the object on the proximal side may increase a possibility that the photographer can focus on the intended object. Thus, for example, when the microprocessor 116 calculates a difference between the defocus amount of the AF area and the average value in Step 1002, and the valid defocus amount of the AF area which is output as that the object exists in the proximal direction is obtained by multiplying the difference between the defocus amount and the average value by ¾. Accordingly, the AF area hardly becomes the one having the maximum difference, and a frequency to use the AF area output as that the object exists in the proximal side can be increased.

[Position Control of Zoom Lens]

Next, control of the focus lens 105 and the zoom lens 102 is described with reference to a flowchart in FIG. 11.

First, in Step 1201, the microprocessor 116 (a zoom lens position detection unit) detects a zoom lens position Zpos. In this embodiment, the microprocessor 116 reads a pulse count value of the stepping motor 110a for driving the zoom lens 102 and stores the value in the RAM (Pstp).

Next, in Step 1202, the microprocessor 116 reads an operation amount of the zooming operation unit 118 by a user.

In Step 1203, the microprocessor 116 (a zoom speed obtainment unit) obtains a zoom speed Vz as a moving speed of the zoom lens 102 based on the operation amount of the zooming operation unit 118. This is because the image capturing apparatus 100 such as a video camera can generally change a zoom speed of the zoom lens according to the operation amount of the zooming operation unit 118.

In this regard, as long as the zoom speed Vz may be obtained, the method is not limited to the one in Step 1202 or Step 1203. For example, the position of the zoom lens 102 may be detected along at least 2 data points (2 positions) in time, and the zoom speed Vz may be calculated using the relevant position information (information about change in position and time) instead of the processing in Step 1202 or Step 1203.

More specifically, according to the present exemplary embodiment of the present invention, the stepping motor 110a is used for driving the zoom lens 102. The speed of the zoom lens 102 may be detected by calculating the zoom speed Vz corresponding to the operation amount of the zooming operation unit 118. When the zoom lens 102 is manually moved, the speed of the zoom lens 102 may be detected by calculating a difference of positional changes per unit time of a position detection unit of the zoom lens 102.

In Step 1204, the microprocessor 116 determines whether the zoom speed Vz calculated in Step 1203 is zero. When the zoom speed Vz is not zero (NO in Step 1204), the zoom lens 102 is in a state of continuing zoom driving, so that the processing proceeds to Step 1205, and the microprocessor 116 calculates a moving pulse number (ΔPstp) of the stepping motor 110a. Since the control program is executed every control period ΔT of the image signal in the image capturing apparatus 100, the target position here is the moving pulse number ΔPstp which is the number of pulses corresponding to a distance that the zoom lens is moved at the zoom speed Vz determined in Step 1204 in a ΔT second.

$$\Delta Pstp = \Delta T * Vz \quad (7)$$

Next, in Step 1206, the microprocessor 116 (a target zoom lens position obtainment unit) obtains and stores a target zoom lens position Zpt in the RAM (Ptgt). The microprocessor 116 calculates the target zoom lens position Zpt by adding the zoom lens position Zpos detected in Step 1201 to the zoom movement amount ΔPstp calculated in Step 1205 according to a zoom driving direction (for example, a tele direction: Vz>0, a wide direction: Vz<0).

$$Zpt = Zpos \pm \Delta Pstp \quad (8)$$

When the target zoom lens position Zpt exceeds a range from the wide end (Zwide) to the tele end (Ztele) of the zoom lens, the microprocessor 116 limits the target zoom lens position Zpt so as to fall within the range from Zwide to Ztele. Then, the processing proceeds to Step 1208.

On the other hand, in Step 1204, when it is determined that the zoom speed Vz is zero (YES in Step 1204), the processing proceeds to Step 1207. When the zoom speed Vz is zero, it is a state in which zooming is stopped. Thus, the microprocessor 116 (the target zoom lens position obtainment unit) obtains and sets the current zoom lens position Zpos (the count value of the stepping motor 110a) as the target zoom lens position Zpt. Then, the processing proceeds to a focus lens position control routine in Step 1208 (described in detail below). In Step 1208, a target focus lens position and a target focus speed of the focus lens 105 are determined, and in Step 1209 described below, the zoom lens 102 and the focus lens 105 are driven.

[AF Control Using Cam Locus Data]

Figure 11:
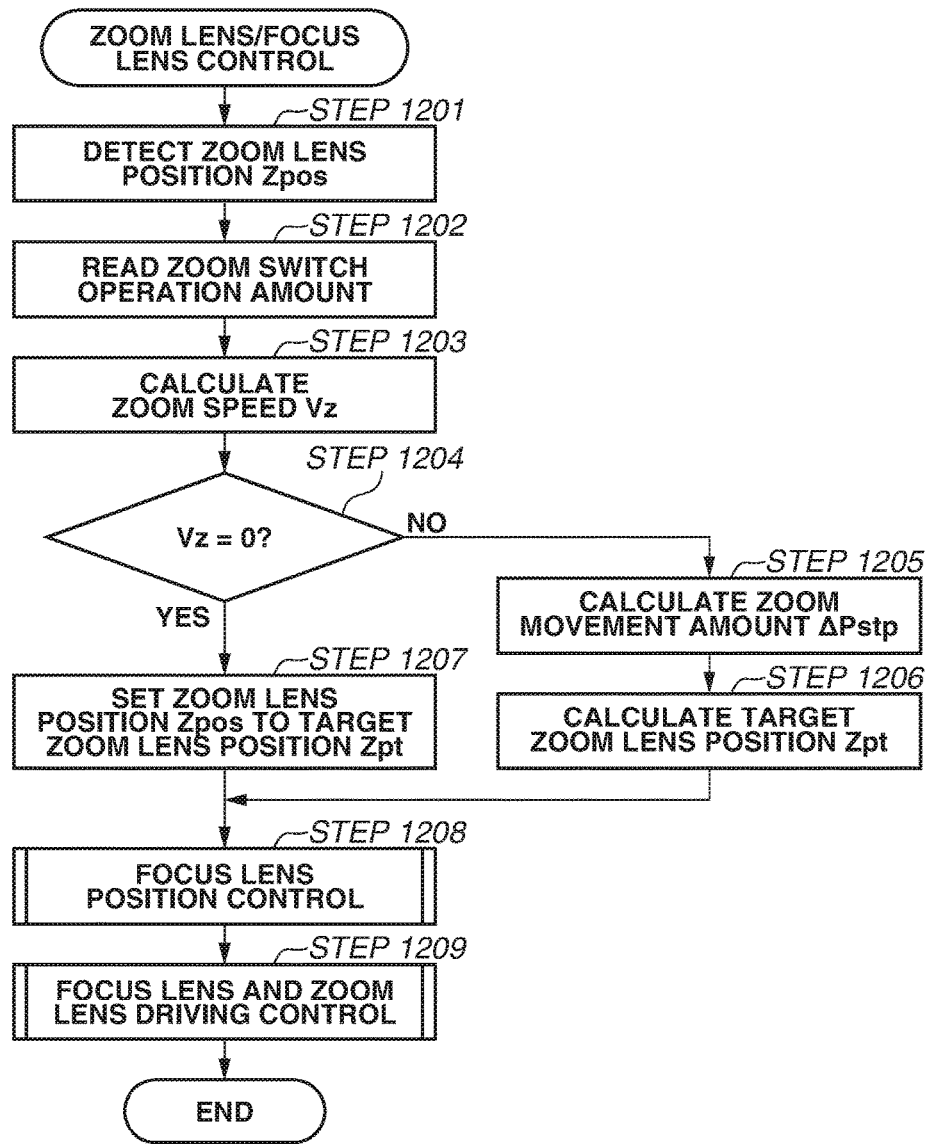
FIG. 11 is a flowchart illustrating control of a zoom lens and a focus lens.

Next, the focus lens position control in Step 1208 in FIG. 11 is described below with reference to a flowchart in FIG. 12 and FIGS. 13A and 13B.

First, in Step 1301, the microprocessor 116 (a focus lens position detection unit) reads position detection data (Fpos: 1402) of the focus lens 105 and stores the data in the RAM.

Next, in Step 1302, the microprocessor 116 determines whether the zoom lens 102 is in a driving state. When the zoom lens 102 is in the driving state (YES in Step 1302), the processing proceeds to Step 1303, whereas when the zoom lens 102 is in the stopped state (NO in Step 1302), the processing proceeds to Step 1309. For example, whether the stepping motor 110a is in the driving state or not is detected, and thus the microprocessor 116 can determine whether the zoom lens 102 is in the driving state or not.

In Step 1303, a defocus amount Def is obtained from the AF signal processing unit 109 by the above-described processing.

In Step 1304, the microprocessor 116 (a coefficient setting unit) calculates a coefficient α for the microprocessor 116 (a correction unit) to correct the defocus amount Def. The coefficient α is set according to the zoom speed Vz. According to the present exemplary embodiment, a data table representing a correspondence relationship between the zoom speed Vz and the coefficient α as in FIG. 13B is stored in the memory 117 in advance.

Figure 13A:
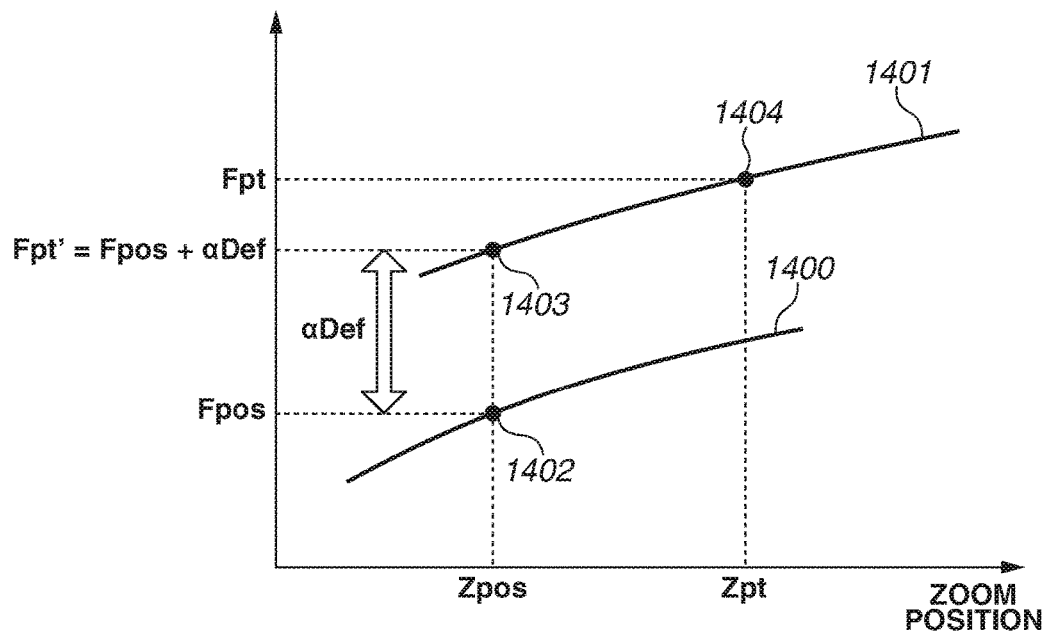
FIGS. 13A and 13B illustrate a method for setting target cam locus data.
Figure 13B:
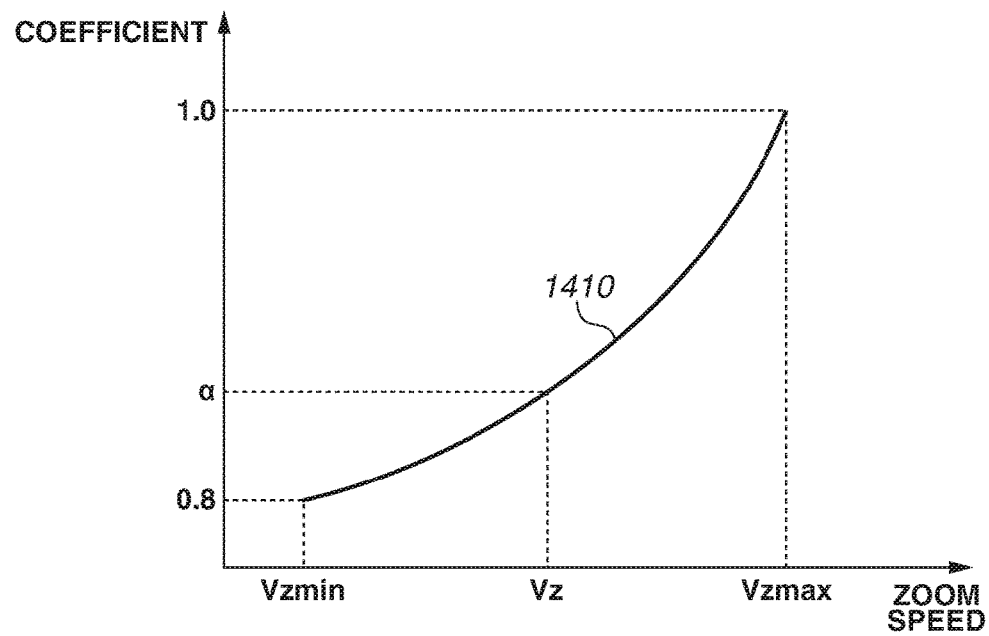

In an example in FIG. 13B, as the zoom speed Vz becomes greater, a value of the coefficient α approaches 1.0. As the coefficient α approaches 1.0, a correction defocus amount to be calculated gets closer to the defocus amount calculated in Step 1303. Accordingly, the focus can be controlled with high responsiveness as compared with the case when the coefficient is smaller. Therefore, even in the case that the zoom speed Vz is high, and the focus detection is less frequently performed with respect to a change in the zoom magnification, driving of the focus lens can be controlled to make a change in the focus state inconspicuous while preventing an image blur from being significantly conspicuous because the driving of the focus lens is not in time.

In addition, in the example in FIG. 13B, as the zoom speed Vz is lower, the value of the coefficient α approaches 0.8. In other words, the correction defocus amount to be calculated is corrected to a value smaller than the defocus amount calculated in Step 1303. Accordingly, when the zoom speed Vz is low, the focus lens can be driven by reducing the responsiveness for a certain degree, and thus the driving of the focus lens can be controlled to make the change in the focus state inconspicuous. In other words, when the zoom speed Vz is a speed at which the responsiveness can be determined to be reduced for a certain degree (less than a predetermined speed), the correction defocus amount is set smaller than the defocus amount calculated in Step 1303.

It is desirable that the coefficient α is set by paying attention to that the focus lens does not overshoot the focusing position. When the zoom speed Vz is low, the focusing operation by the focus lens 105 in a moving image is conspicuous as compared with the case when the zoom speed Vz is high, and it is especially desirable to pay attention to that the focus lens does not overshoot the focusing position. Thus, it is desirable that a minimum value of the coefficient α (the coefficient α when the zoom speed Vz is the minimum speed) is less than one. In other words, when the zoom speed Vz is the speed at which the responsiveness can be determined to be reduced for a certain degree (less than the predetermined speed), the coefficient α is set smaller than one to make the correction defocus amount smaller than the defocus amount calculated in Step 1303.

On the other hand, when the zoom speed Vz is high, the focus detection is less frequently performed if the other conditions are the same as compared with the case when the zoom speed Vz is low, so that the coefficient α is larger to reach the focusing cam locus more quickly. Even in this case, it is desirable that the coefficient α has a value closer to one so that the focus lens does not overshoot the focusing position. From the above descriptions, it is desirable that the maximum value of the coefficient α (the coefficient α when the zoom speed Vz is the maximum speed) is set to a value closer to one as compared with the minimum value of the coefficient α. In this regard, the coefficient α has a value greater than zero.

As described above, according to the present exemplary embodiment, the coefficient α is determined using the data table stored in the memory 117, however, several threshold values Vzth may be provided for the zoom speed Vz, and the coefficient may be switched according to a relationship between the zoom speed Vz and the threshold value. Further, a relationship between the zoom speed Vz and the coefficient α may be set as a function F as expressed in a following formula, and the microprocessor 116 may determine the coefficient α by calculation.

$$\alpha = F(Vz) \qquad (9)$$

In Step 1305, the microprocessor 116 calculates a correction focus lens position Fpt 1403 used for determination of target cam locus data CamT 1401 by a following formula. The microprocessor 116 calculates the correction focus lens position Fpt 1403 by the following formula based on a correction defocus amount aDef and a focus lens position Fpos 1402.

$$Fpt = Fpos + \alpha Def \qquad (10)$$

In Step 1306, the microprocessor 116 (a determination unit) selects the target cam locus data CamT 1401 used for calculation of a target focus lens position Fpt from among the cam locus data pieces stored in the memory 117. The microprocessor 116 determines the target cam locus data CamT 1401 based on the correction focus lens position Fpt 1403 calculated in Step 1305 and the zoom lens position Zpos.

Next, in Step 1307, the microprocessor 116 (a target focus lens position obtainment unit) obtains the target focus lens position Fpt corresponding to the target zoom lens position Zpt using the target cam locus data CamT 1401 determined in Step 1306. The target zoom lens position Zpt used here is the target zoom lens position Zpt calculated in Step 1206 or Step 1207.

In Step 1308, the microprocessor 116 calculates a target focus speed Vf by a following formula based on the above-described control period ΔT and advances the processing to Step 1209.

$$Vf = (Fpt - Fpos)/\Delta T \qquad (11)$$

On the other hand, in Step 1302, when the microprocessor 116 determines that the zoom lens 102 is in the stopped state (NO in Step 1302), the processing proceeds to Step 1309, and the focus lens position Fpos 1402 which is the current focus lens position is set to the target focus lens position Fpt.

Figure 12:
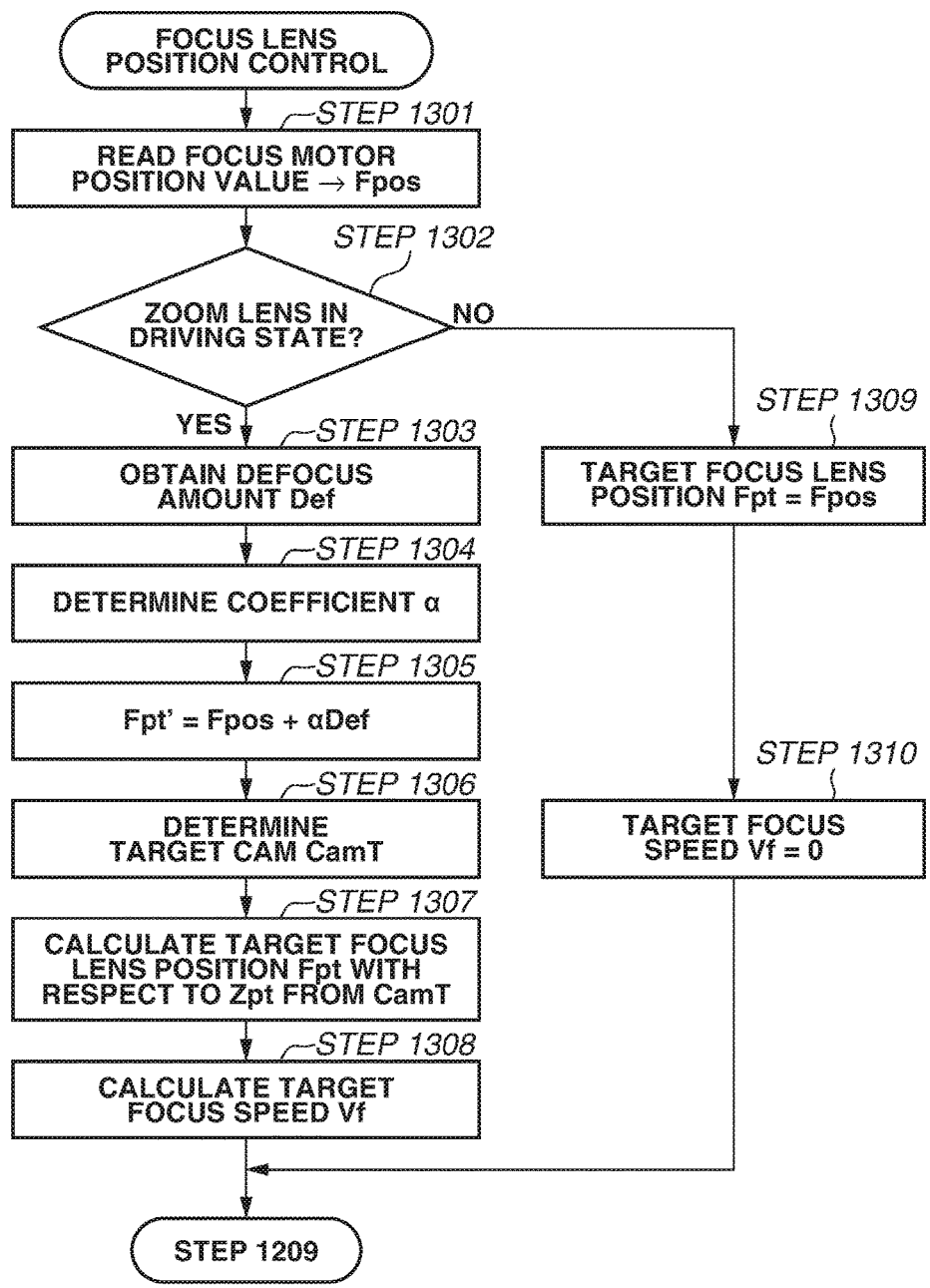
FIG. 12 is a flowchart illustrating processing for setting a movement target position of the focus lens.

In Step 1310, the microprocessor 116 sets the target focus speed Vf to zero, terminates the processing in the flowchart in FIG. 12, and advances the processing to Step 1209.

Figure 14:
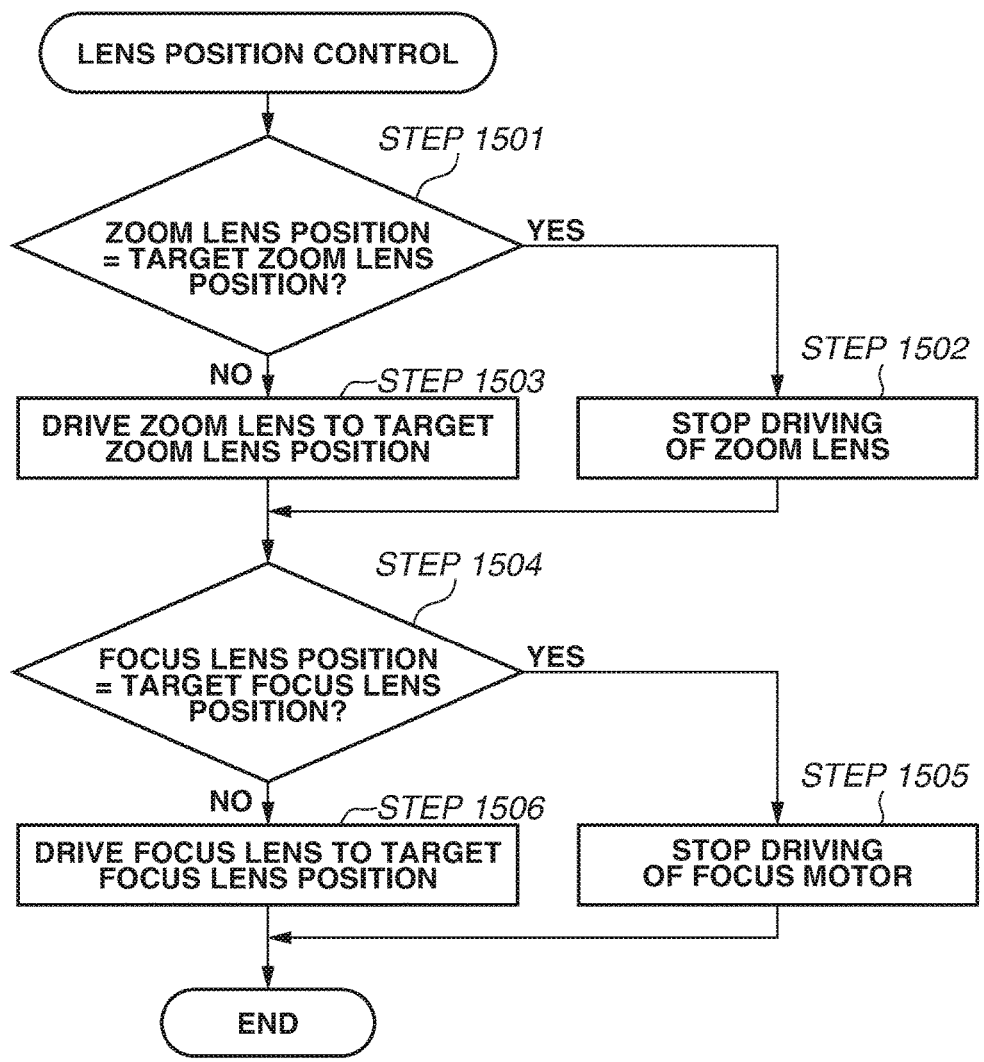
FIG. 14 is a flowchart illustrating operations for driving the zoom lens and the focus lens.

Next, the driving control of the zoom lens 102 and the focus lens 105 in Step 1209 in FIG. 11 is described with reference to a flowchart in FIG. 14. In FIG. 14, the microprocessor 116 (a lens control unit) controls the driving of the zoom lens 102 and the focus lens 105.

First, in Step 1501, the microprocessor 116 determines whether the zoom lens position Zpos matches with the target zoom lens position Zpt. When the zoom lens position Zpos does not match with the target zoom lens position Zpt (NO in Step 1501), the processing proceeds to Step 1503, the zoom lens 102 is controlled to move to the target zoom lens position Zpt. On the other hand, in Step 1501, when the microprocessor 116 determines that the zoom lens position Zpos matches with the target zoom lens position Zpt (YES in Step 1501), the processing proceeds to Step 1502, where the driving of the zoom lens 102 is stopped, and the processing proceeds to Step 1504.

In Step 1504, the microprocessor 116 determines whether the focus lens position Fpos matches with the target focus lens position Fpt. When the focus lens position Fpos does not match with the target focus lens position Fpt (NO in Step 1504), the processing proceeds to Step 1506, where the focus lens 105 is controlled to move to the target focus lens position Fpt, and the processing is terminated. On the other hand, in Step 1504, when the microprocessor 116 determines that the focus lens position Fpos matches with the target focus lens position Fpt (YES in Step 1504), the processing proceeds to Step 1505, where the driving of the motor is stopped, and the processing is terminated.

[Effect of Setting Coefficient α According to Zoom Speed Vz]

As described above, when driving of the focus lens is controlled during zooming based on the cam locus data, it is desirable that the control is performed so as to make a change in the focus state inconspicuous. According to the present exemplary embodiment, when the zoom speed Vz is low, the correction defocus amount is calculated using the smaller coefficient α as compared with the case when the zoom speed Vz is high. Accordingly, the small correction defocus amount can be obtained in the case when the zoom speed Vz is low as compared with the case when the coefficient is not used, and the driving can be controlled to reduce the responsiveness of the focus lens for a certain degree. According to the control, driving of the focus lens can be controlled to make a change in the focus state inconspicuous.

On the other hand, when the zoom speed Vz is high, the correction defocus amount is calculated using the larger coefficient α as compared with the case when the zoom speed Vz is low. Accordingly, when the zoom speed Vz is low, the cam locus data can be determined using the correction defocus amount which is closer to an original defocus amount as compared with the case when the zoom speed Vz is high. Accordingly, an image blur can be prevented from being significantly conspicuous because the driving of the focus lens is not in time, and thus the driving of the focus lens can be controlled to make a change in the focus state inconspicuous.

Next, a second exemplary embodiment is described. According to the first exemplary embodiment, the coefficient α is varied according to the zoom speed Vz, whereas according to the second exemplary embodiment, the coefficient α is varied according to a frame rate Fr. In other words, the second exemplary embodiment is only different from the first exemplary embodiment in a method for determining the coefficient α in Step 1304 in the flowchart in FIG. 12. The second exemplary embodiment is described below focusing on a different point from the first exemplary embodiment.

The coefficient α according to the second exemplary embodiment is a coefficient changed by the frame rate Fr which is an inverse of the control period ΔT of the image signal. According to the second exemplary embodiment, a relationship between the frame rate Fr and the coefficient α is stored in the memory 117 in advance as a data table 1610 (FIG. 15).

Figure 15:
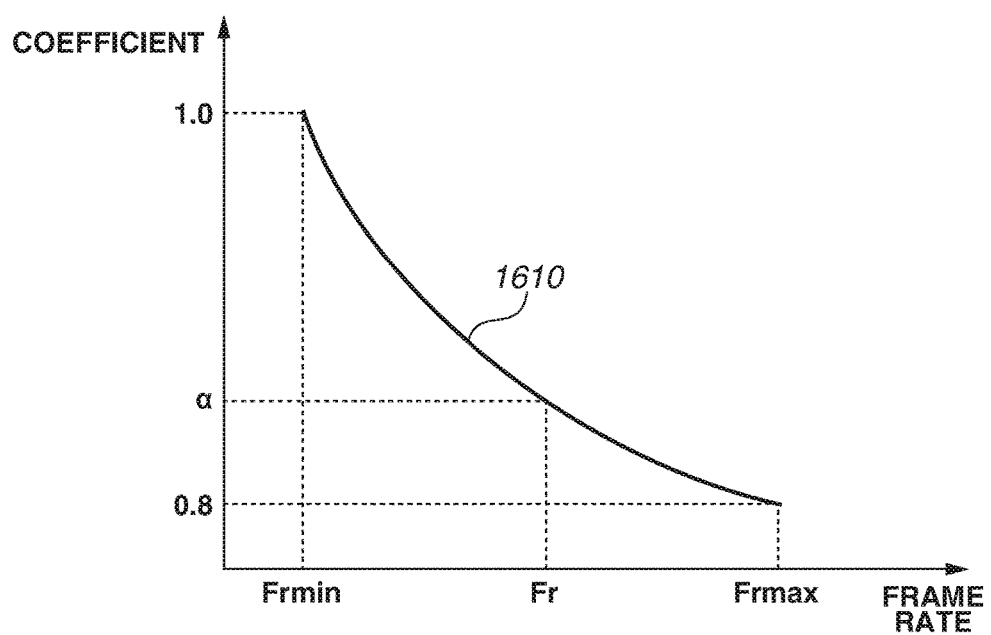
FIG. 15 illustrate a relationship between a frame rate and a coefficient according to a second exemplary embodiment.

In an example in FIG. 15, as the frame rate Fr is lower, the coefficient α approaches 1.0. As the coefficient α approaches 1.0, the correction defocus amount to be calculated gets closer to the defocus amount calculated in Step 1303. Accordingly, the focus can be controlled with high responsiveness as compared with the case when the coefficient is smaller. Therefore, even in the case that the frame rate Fr is low, and the focus detection is less frequently performed with respect to a change in the zoom magnification, driving of the focus lens can be controlled to make a change in the focus state inconspicuous while preventing an image blur from being significantly conspicuous because the driving of the focus lens is not in time.

In addition, in the example in FIG. 15, as the frame rate Fr is higher, the value of the coefficient α approaches 0.8. In other words, the correction defocus amount to be calculated is corrected to a value smaller than the defocus amount calculated in Step 1303. Accordingly, when the frame rate Fr is high, the focus lens can be driven by reducing the responsiveness for a certain degree, and thus the driving of the focus lens can be controlled to make the change in the focus state inconspicuous. In other words, when the frame rate Fr is a frame rate at which the responsiveness can be determined to be reduced for a certain degree (greater than or equal to a predetermined frame rate), the correction defocus amount is set smaller than the defocus amount calculated in Step 1303.

It is desirable that the coefficient α is set by paying attention to that the focus lens does not overshoot the focusing position. Thus, it is desirable that a minimum value of the coefficient α (the coefficient α when the frame rate Fr is the maximum value) is less than one. In other words, when the frame rate Fr is the frame rate at which the responsiveness can be determined to be reduced for a certain degree (greater than the predetermined frame rate), the coefficient α is set smaller than one. This is to make the correction defocus amount smaller than the defocus amount calculated in Step 1303.

Further, when the frame rate Fr is low, the focus detection is less frequently performed if the other conditions are the same as compared with the case when the frame rate Fr is high, so that the coefficient α is larger to reach the focusing cam locus more quickly. Even in this case, it is desirable that the coefficient α has a value closer to one so that the focus lens does not overshoot the focusing position. From the above descriptions, it is desirable that the maximum value of the coefficient α (the coefficient α when the frame rate Fr is the minimum) is set to a value closer to one as compared with the minimum value of the coefficient α. In this regard, the coefficient α has a value greater than zero.

As described above, according to the present exemplary embodiment, the coefficient α is determined using the data table stored in the memory 117, however, several threshold values Frth may be provided for the frame rate Fr, and the coefficient may be switched according to a relationship between the frame rate Fr and the threshold value. Further, a relationship between the frame rate Fr and the coefficient α may be set as a function G as expressed in a following formula, and the microprocessor 116 may determine the coefficient α by calculation.

$$\alpha = G(Fr) \quad (12)$$

Subsequently, the processing proceeds to Step 1305. The processing in Step 1305 and the subsequent steps is similar to that in the flowchart in FIG. 11 described in the first exemplary embodiment.

[Effect of Setting Coefficient α According to Frame Rate Fr]

As described above, when driving of the focus lens is controlled during zooming based on the cam locus data, it is desirable that the control is performed so as to make a change in the focus state inconspicuous. According to the present exemplary embodiment, when the frame rate Fr is high, the correction defocus amount is calculated using the smaller coefficient α as compared with the case when the frame rate Fr is low. Accordingly, the small correction defocus amount can be obtained in the case when the frame rate Fr is high as compared with the case when the coefficient is not used, and the driving can be controlled to reduce the responsiveness of the focus lens for a certain degree. According to the control, driving of the focus lens can be controlled to make a change in the focus state inconspicuous.

On the other hand, when the frame rate Fr is low, the correction defocus amount is calculated using the larger coefficient α as compared with the case when the frame rate Fr is high. Accordingly, when the frame rate Fr is low, the cam locus data can be determined using the correction defocus amount which is closer to the original defocus amount as compared with the case when the frame rate Fr is high. Accordingly, an image blur can be prevented from being significantly conspicuous because the driving of the focus lens is not in time, and thus the driving of the focus lens can be controlled to make a change in the focus state inconspicuous.

Next, a third exemplary embodiment is described. As described above, according to the first and the second exemplary embodiments, the coefficient α is varied according to the zoom speed Vz or the frame rate Fr. In contrast, according to the third exemplary embodiment, a threshold value is provided for a driving speed of the focus lens, and the threshold value is varied according to the zoom speed Vz.

The third exemplary embodiment is different from the first exemplary embodiment in a flowchart (position control processing of the focus lens) in FIG. 12 which is a sub-flow of Step 1208 in the flowchart in FIG. 11. The third exemplary embodiment is described focusing on a different point from the first exemplary embodiment with reference to a flowchart in FIG. 16 and FIGS. 17A and 17B.

First, in Step 1701, the microprocessor 116 reads the position detection data (Fpos: 1802) of the focus lens 105 and stores the data in the RAM.

Next, in Step 1702, the microprocessor 116 determines whether the zoom lens 102 is in the driving state. In the case of the driving state (YES in Step 1702), the processing proceeds to Step 1703, and in the case of the stopped state (NO in Step 1702), the processing proceeds to Step 1711.

In Step 1703, the microprocessor 116 obtains the defocus amount Def based on a signal from the AF signal processing unit 109.

In Step 1704, the microprocessor 116 calculates a correction focus lens position Fpt 1803 used for determination of target cam locus data CamT 180. The microprocessor 116 calculates the correction focus lens position Fpt 1803 by a following formula based on the defocus amount Def and the focus lens position Fpos 1802.

$$Fpt' = Fpos + Def \quad (13)$$

In Step 1705, the microprocessor 116 (the determination unit) determines the target cam locus data CamT 1801 used for calculation of the target focus lens position Fpt from among the cam locus data pieces stored in the memory 117. The microprocessor 116 determines the target cam locus data CamT 1801 based on the correction focus lens position Fpt 1803 calculated in Step 1704 and the zoom lens position Zpos.

Next, in Step 1706, the microprocessor 116 calculates the target focus lens position Fpt corresponding to the target zoom lens position Zpt using the determined target cam locus data CamT 1801 and advances the processing to Step 1707.

In Step 1707, the microprocessor 116 (a threshold value setting unit) sets a focus limit speed Vf_limit (a first threshold value) as a threshold value of a driving speed of the focus lens 105. The focus limit speed Vf_limit is a value to be changed according to the zoom speed Vz and a threshold value in the processing in Step 1709 described below. When the zoom speed Vz is high, the focus limit speed Vf_limit is greater as compared with the case when the zoom speed Vz is low.

Figure 17A:
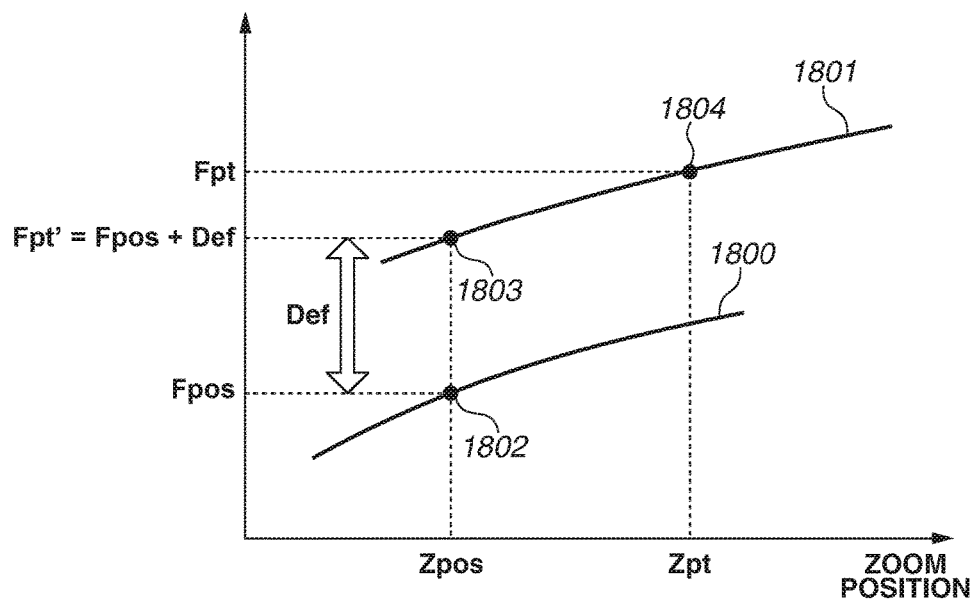
FIGS. 17A and 17B illustrate a method for setting target cam locus data according to the third exemplary embodiment.
Figure 17B:
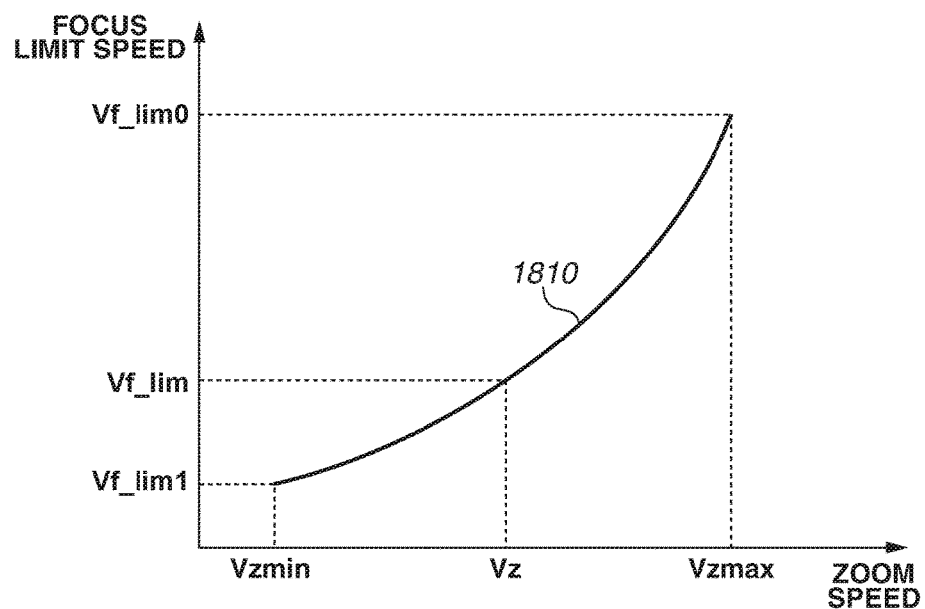

Further, the focus limit speed Vf_limit may be changed according to the frame rate Fr. In this case, when the frame rate Fr is high, the focus limit speed Vf_limit is greater as compared with the case when the frame rate Fr is low. A relationship between the zoom speed Vz and the focus limit speed Vf_limit as illustrated in FIG. 17B or a relationship between the frame rate Fr and the focus limit speed Vf_limit (not illustrated) is stored in the memory 117 as a data table.

As described above, the focus limit speed Vf_limit is set, and thus a change in the focus state can be prevented from being conspicuous because of overshooting the focusing position of the focus lens or because the driving of the focus lens is not in time.

According to the third exemplary embodiment, the focus limit speed Vf_limit is determined by using a data table 1810, however, several threshold values Vzth may be provided for the zoom speed Vz, and the focus limit speed Vf_limit may be switched according to a relationship between the zoom speed Vz and each threshold value. Further, a relationship between the zoom speed Vz and the focus limit speed Vf_limit may be set as a function H as expressed in a following formula, and the microprocessor 116 may determine the focus limit speed Vf_limit by calculation.

$$Vf\_limit = H(Vz) \quad (14)$$

In Step 1708, the microprocessor 116 (a target focus speed calculation unit) calculates the target focus speed Vf by a following formula based on the above described control period $\Delta T$ and advances the processing to Step 1709.

$$Vf = (Fpt - Fpos)/\Delta T \quad (15)$$

In Step 1709, the microprocessor 116 determines whether the target focus speed Vf is greater than the focus limit speed Vf_limit (the first threshold value). When the target focus speed Vf is greater than the focus limit speed Vf_limit (YES in Step 1709), the processing proceeds to Step 1710, and the target focus speed Vf is set as the focus limit speed Vf_limit. Whereas when the target focus speed Vf is smaller than the focus limit speed Vf_limit (NO in Step 1709), the processing in the flowchart in FIG. 16 is terminated, and the processing proceeds to Step 1209.

On the other hand, in Step 1702, when the microprocessor 116 determines that the zoom lens 102 is in the stopped state (NO in Step 1702), the processing proceeds to Step 1711, and the focus lens position Fpos is set as the target focus lens position Fpt.

Figure 16:
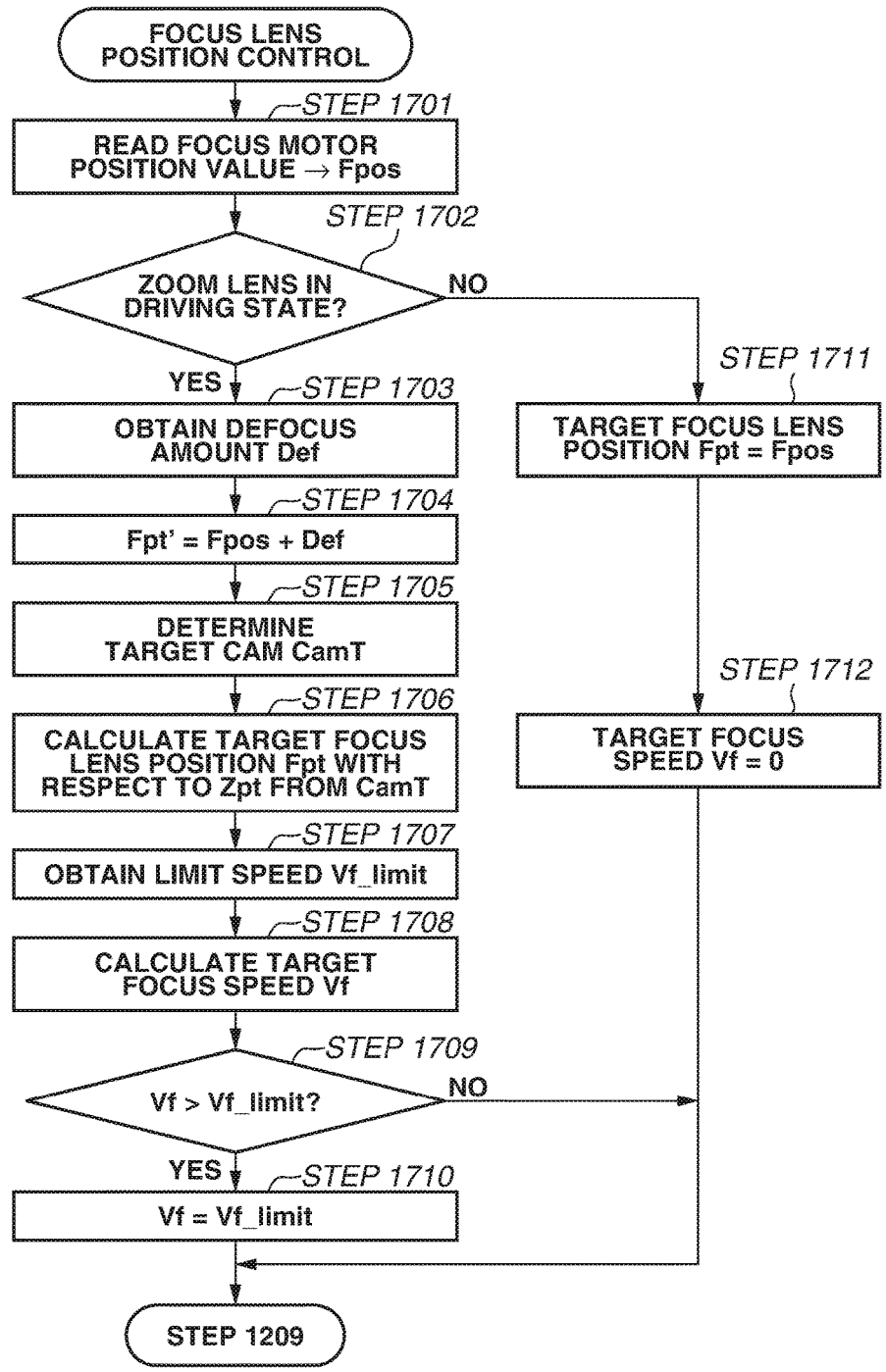
FIG. 16 is a flowchart illustrating setting of a movement target position of a focus lens according to a third exemplary embodiment.

Then, in Step 1712, the microprocessor 116 sets the target focus speed Vf to zero, terminates the processing in the flowchart in FIG. 16, and advances the processing to Step 1209. The subsequent processing is as described in the first exemplary embodiment.

[Effect of Setting Focus Limit Speed Vf_Limit]

As described above, when driving of the focus lens is controlled during zooming based on the cam locus data, it is desirable that the control is performed so as to make a change in the focus state inconspicuous. According to the present exemplary embodiment, when the zoom speed Vz is low (or when the frame rate Fr is high), the driving of the focus lens 105 is controlled using the smaller focus limit speed Vf_limit as compared with the case when the zoom speed Vz is high (or when the frame rate Fr is low). Accordingly, when the zoom speed Vz is low (or when the frame rate Fr is high), the driving can be controlled to reduce the responsiveness of the focus lens for a certain degree as compared with the case when the focus limit speed Vf_limit is not used. According to the control, driving of the focus lens can be controlled to make a change in the focus state inconspicuous.

On the other hand, when the zoom speed Vz is high (or when the frame rate Fr is low), the driving of the focus lens 105 is controlled using the greater focus limit speed Vf_limit as compared with the case when the zoom speed Vz is low (or when the frame rate Fr is high). Accordingly, when the zoom speed Vz is high (or when the frame rate Fr is low), the focus lens 105 can be controlled to be driven at a speed closer to an original speed as compared with the case when the zoom speed Vz is low (or when the frame rate Fr is high). Accordingly, an image blur can be prevented from being significantly conspicuous because the driving of the focus lens is not in time, and thus the driving of the focus lens can be controlled to make a change in the focus state inconspicuous.

Other Embodiments

According to the above-described exemplary embodiments, the cases are described by assuming that the lenses are integrated into the image capturing apparatus, however, the present invention can be applied to a lens and a lens interchangeable type image capturing apparatus.

Further, according to the above-described exemplary embodiments, it is described that the coefficient $\alpha$ or the focus limit speed Vf_limit is varied according to the zoom speed Vz or the frame rate Fr, however, both of the zoom speed Vz and the frame rate Fr may be taken into consideration. In this case, the memory 117 may include a data table representing a correspondence relationship of the coefficient $\alpha$ or the focus limit speed Vf_limit with respect to two parameters of the zoom speed Vz and the frame rate Fr.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

For example, when various data pieces such as the above-described correction defocus amount are obtained, it is needless to say that the various data pieces may be obtained by performing calculation (computation) based on functions and may be obtained using function tables such a look-up table stored in the memory.

According to the present invention, when driving of the focus lens is controlled based on, for example, cam locus data and the like, the driving of the focus lens can be controlled to make a change in the focus state inconspicuous.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-072983, filed Mar. 31, 2016, which is hereby incorporated by reference herein in its entirety.

What is claimed is:

1. A lens control apparatus comprising:
a correction unit configured to correct a defocus amount and obtain a correction defocus amount;
a target zoom lens position obtainment unit configured to obtain a target zoom lens position; and
a target focus lens position obtainment unit configured to obtain a target focus lens position based on data representing a position of a focus lens corresponding to a position of a zoom lens for each object distance, the correction defocus amount, and the target zoom lens position,
wherein, in a case that a zoom speed is a first speed, the correction unit corrects the correction defocus amount to be greater as compared with a case that the zoom speed is a second speed less than the first speed.

2. The lens control apparatus according to claim 1 further comprising a zoom speed obtainment unit configured to obtain the zoom speed.

3. The lens control apparatus according to claim 1, wherein the first speed is greater than or equal to a predetermined speed, and the second speed is less than the predetermined speed.

4. The lens control apparatus according to claim 3, wherein the correction unit corrects the defocus amount so that the correction defocus amount obtained by the correction unit in the case that the zoom speed is the first speed is a value closer to the defocus amount than in the case that the zoom speed is the second speed.

5. The lens control apparatus according to claim 4 further comprising:
a coefficient setting unit configured to set a coefficient used by the correction unit for correcting the correction defocus amount according to the zoom speed, and
wherein the coefficient set by the coefficient setting unit in the case that the zoom speed is the first speed is greater than the coefficient set by the coefficient setting unit in the case that the zoom speed is the second speed.

6. The lens control apparatus according to claim 5, wherein the coefficient set by the coefficient setting unit in the case that the zoom speed is the first speed is less than 1.

7. The lens control apparatus according to claim 5, wherein the coefficient in the case that the zoom speed is the first speed is closer to 1 as compared with the coefficient in the case that the zoom speed is the second speed.

8. The lens control apparatus according to claim 5 further comprising a data table representing a correspondence relationship between the zoom speed and the coefficient.

9. The lens control apparatus according to claim 5, wherein the coefficient setting unit sets the coefficient based on a predetermined function representing a correspondence relationship between the zoom speed and the coefficient.

10. The lens control apparatus according to claim 1, further comprising a lens control unit configured to control driving of the focus lens and the zoom lens according to the target zoom lens position and the target focus lens position.

11. A lens control apparatus comprising:
a correction unit configured to correct a defocus amount and obtain a correction defocus amount;
a target zoom lens position obtainment unit configured to obtain a target zoom lens position; and
a target focus lens position obtainment unit configured to obtain a target focus lens position based on data representing a position of a focus lens corresponding to a position of a zoom lens for each object distance, the correction defocus amount, and the target zoom lens position,
wherein, in a case that a frame rate is a first frame rate, the correction unit corrects the correction defocus amount to be larger as compared with a case that the frame rate is a second frame rate higher than the first frame rate.

12. The lens control apparatus according to claim 11 further comprising a frame rate determination unit configured to determine a frame rate.

13. The lens control apparatus according to claim 11, wherein the first frame rate is less than a predetermined frame rate, and the second frame rate is greater than or equal to the predetermined frame rate.

14. The lens control apparatus according to claim 13, wherein the correction unit corrects the defocus amount so that the correction defocus amount in the case that the frame rate is the first frame rate is a value closer to the defocus amount than the case that the frame rate is the second frame rate.

15. The lens control apparatus according to claim 14 further comprising:
a coefficient setting unit configured to set a coefficient used by the correction unit for correcting the correction defocus amount according to the frame rate, and
wherein the coefficient set by the coefficient setting unit in the case that the frame rate is the first frame rate is greater than the coefficient set by the coefficient setting unit in the case that the frame rate is the second frame rate.

16. The lens control apparatus according to claim 15, wherein the coefficient is less than one in a case that the frame rate is greater than or equal to the predetermined frame rate.

17. The lens control apparatus according to claim 15, wherein the coefficient set by the coefficient setting unit in the case of the first frame rate is a value closer to one than the coefficient set by the coefficient setting unit in the case of the second frame rate.

18. The lens control apparatus according to claim 15 further comprising a data table representing a correspondence relationship between the frame rate and the coefficient.

19. The lens control apparatus according to claim 15, wherein the coefficient is set based on a function representing a correspondence relationship between the frame rate and the coefficient.

20. The lens control apparatus according to claim 11 further comprising a lens control unit configured to control driving of the focus lens and the zoom lens according to the target zoom lens position and the target focus lens position.

21. A method for controlling a lens control apparatus, the method comprising:

correcting a defocus amount and obtaining a correction defocus amount;

obtaining a target zoom lens position;

obtaining a target focus lens position based on data representing a position of a focus lens corresponding to a position of a zoom lens for each object distance, the correction defocus amount, and the target zoom lens position; and in a case that a zoom speed is a first speed, correcting the correction defocus amount to be greater as compared with a case that the zoom speed is a second speed less than the first speed.

22. A method for controlling a lens control apparatus, the method comprising:

correcting a defocus amount and obtaining a correction defocus amount;

obtaining a target zoom lens position;

obtaining a target focus lens position based on data representing a position of a focus lens corresponding to a position of a zoom lens for each object distance, the correction defocus amount, and the target zoom lens position; and in a case that a frame rate is a first frame rate, correcting the correction defocus amount to be greater as compared with a case that the frame rate is a second frame rate higher than the first frame rate.

* * * * *